US012602414B2

(12) United States Patent
Pickens

(10) Patent No.: US 12,602,414 B2
(45) Date of Patent: Apr. 14, 2026

(54) SYSTEM AND FOR TO DETERMINE DIVERSE AND RELEVANT PASSAGES OF DOCUMENTS

(71) Applicant: OPEN TEXT INC., Menlo Park, CA (US)

(72) Inventor: Jeremy Garner Pickens, Bloomville, NY (US)

(73) Assignee: OPEN TEXT INC., Menlo Park, CA (US)

( * ) Notice: Subject to any disclaimer, the term of this patent is extended or adjusted under 35 U.S.C. 154(b) by 0 days.

(21) Appl. No.: 18/191,717

(22) Filed: Mar. 28, 2023

(65) Prior Publication Data

US 2023/0325420 A1 Oct. 12, 2023

Related U.S. Application Data

(60) Provisional application No. 63/330,909, filed on Apr. 14, 2022, provisional application No. 63/324,694, filed on Mar. 29, 2022.

(51) Int. Cl.
| | |
|---|---|
| *G06F 16/435* | (2019.01) |
| *G06F 16/2457* | (2019.01) |
| *G06F 16/3332* | (2025.01) |
| *G06F 16/34* | (2019.01) |
| *G06F 40/205* | (2020.01) |

(52) U.S. Cl.
CPC .... *G06F 16/3334* (2019.01); *G06F 16/24578* (2019.01); *G06F 16/34* (2019.01); *G06F 16/435* (2019.01); *G06F 40/205* (2020.01)

(58) Field of Classification Search
None
See application file for complete search history.

(56) References Cited

U.S. PATENT DOCUMENTS

| | | | | |
|---|---|---|---|---|
| 10,169,453 | B2 | 1/2019 | Luo | |
| 10,650,332 | B1 * | 5/2020 | Sinha | G06Q 10/063 |
| 10,671,616 | B1 * | 6/2020 | Frankle | G06F 16/2455 |
| 12,326,887 | B2 | 6/2025 | Pickens | |
| 2003/0028520 | A1 * | 2/2003 | Alpha | G06F 16/24578 |
| 2015/0178322 | A1 * | 6/2015 | Smietanka | G06F 16/5866 |
| | | | | 707/772 |
| 2017/0277668 | A1 | 9/2017 | Luo | |
| 2019/0303375 | A1 | 10/2019 | Bai | |
| 2022/0129492 | A1 * | 4/2022 | Zouhri | G06F 16/382 |
| 2023/0325393 | A1 | 10/2023 | Pickens | |

OTHER PUBLICATIONS

Office Action issued for U.S. Appl. No. 18/191,708, mailed Jun. 21, 2024, 10 pages.
Notice of Allowance issued in U.S. Appl. No. 18/191,708 mailed Jan. 15, 2025 (17 pages).
Notice of Allowance issued in U.S. Appl. No. 18/191,708 mailed May 12, 2025 (9 pages).

* cited by examiner

*Primary Examiner* — Thu N Nguyen
(74) *Attorney, Agent, or Firm* — Sprinkle IP Law Group

(57) ABSTRACT

Systems and methods for selecting multiple, diverse passages of a document based on such a relevancy model are disclosed.

21 Claims, 7 Drawing Sheets

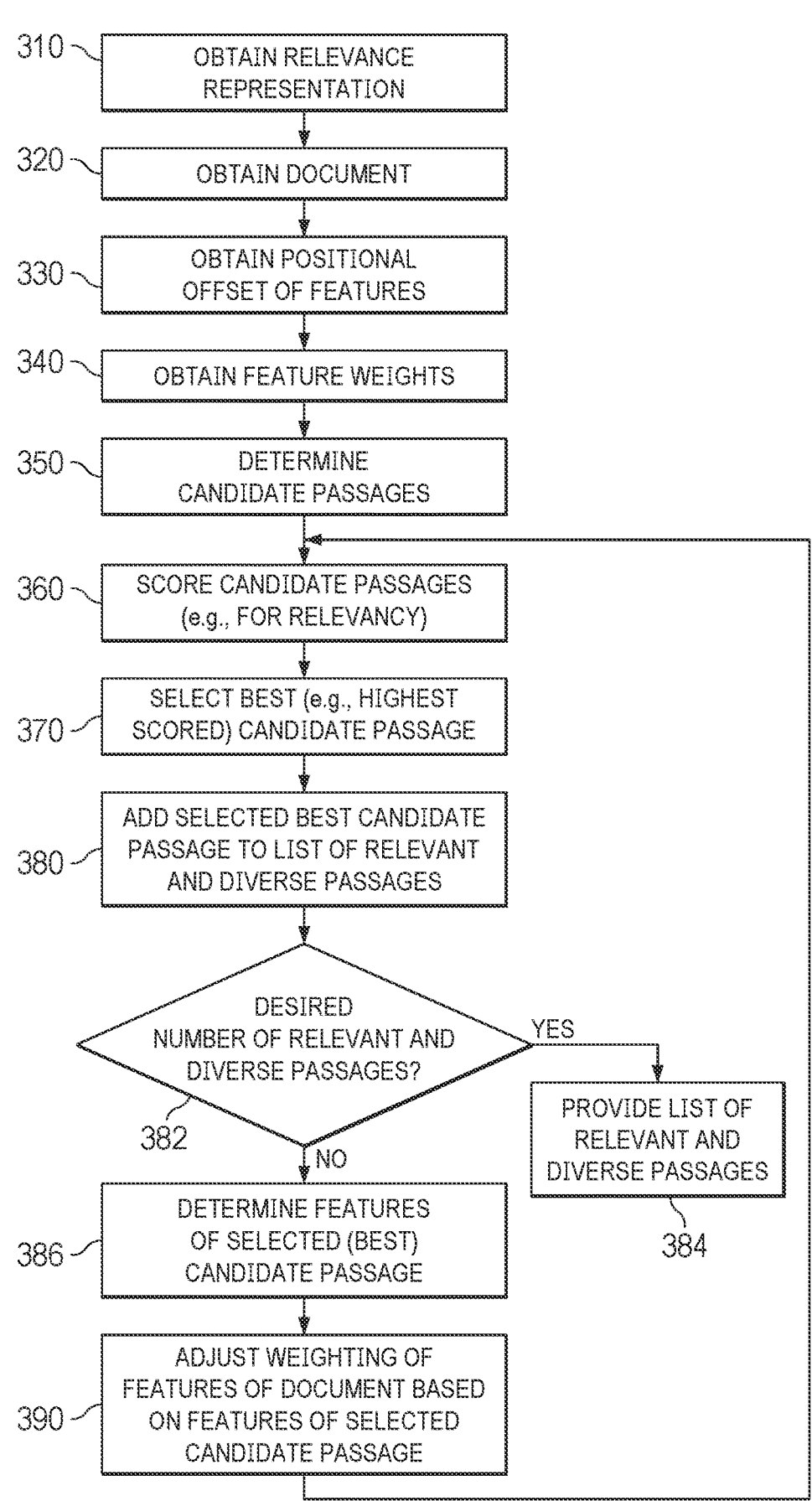

310 — OBTAIN RELEVANCE REPRESENTATION

320 — OBTAIN DOCUMENT

330 — OBTAIN POSITIONAL OFFSET OF FEATURES

340 — OBTAIN FEATURE WEIGHTS

350 — DETERMINE CANDIDATE PASSAGES

360 — SCORE CANDIDATE PASSAGES (e.g., FOR RELEVANCY)

370 — SELECT BEST (e.g., HIGHEST SCORED) CANDIDATE PASSAGE

380 — ADD SELECTED BEST CANDIDATE PASSAGE TO LIST OF RELEVANT AND DIVERSE PASSAGES

382 — DESIRED NUMBER OF RELEVANT AND DIVERSE PASSAGES?

YES

PROVIDE LIST OF RELEVANT AND DIVERSE PASSAGES
384

NO

386 — DETERMINE FEATURES OF SELECTED (BEST) CANDIDATE PASSAGE

390 — ADJUST WEIGHTING OF FEATURES OF DOCUMENT BASED ON FEATURES OF SELECTED CANDIDATE PASSAGE

FIG. 3

SYSTEM AND FOR TO DETERMINE DIVERSE AND RELEVANT PASSAGES OF DOCUMENTS

RELATED APPLICATIONS

This application claims the benefit of priority of U.S. Provisional Patent Application Ser. No. 63/324,694 by Pickens, entitled "SYSTEM AND METHOD FOR DOCUMENT ANALYSIS TO DETERMINE DIVERSE AND RELEVANT PASSAGES OF DOCUMENTS" and filed on Mar. 29, 2022, and U.S. Provisional Patent Application Ser. No. 63/330,909 by Pickens, entitled "SYSTEM AND METHOD FOR DOCUMENT ANALYSIS TO DETERMINE DIVERSE AND RELEVANT PASSAGES OF DOCUMENTS" and filed on Apr. 14, 2022, both of which are fully incorporated herein by reference for all purposes.

TECHNICAL FIELD

This disclosure relates generally to analysis of electronic documents. In particular, this disclosure relates to the analysis of documents to determine relevant and diverse passages from those documents.

BACKGROUND

In the modern world, the vast majority of documents that are being created, utilized and maintained are in electronic format. A number of different situations commonly arise that require an analysis or identification of certain relevant electronic documents from a relatively large pool of available electronic documents. These types of document analysis problems (e.g., information retrieval problems or machine learning problems) crop up in a wide variety of contexts. To aid users in resolving these problems, a document analysis system may be provided in a given electronic context. A document analysis system is typically used to allow users to analyze, review, navigate or search the electronic information to return or analyze responsive electronically stored information.

Many of these document analysis systems make use of what is typically referred to as a search engine (or recommendation engine, used interchangeably herein). A search engine is a computer program used to index electronically stored information (referred to as a corpus) and search the indexed electronic information to return electronically stored information responsive to a search query. In a conventional search engine, a user submits a query, and the search engine selects a set of results from the corpus based on the terms of the search query. The terms of search queries usually specify (key) words, terms, phrases, logical relationships, metadata fields to be searched, synonyms, stemming variations, images or portions of images, sound clips or sound fingerprints, etc.

What is desired are search or document analysis system that are capable of returning search results that are both relevant and diverse.

SUMMARY

As discussed, a nearly universal need in modern computing systems is the analysis or identification of certain relevant electronic documents from a corpus of electronic documents. Document analysis system thus allows users to analyze, review, navigate or search the electronic information to return or analyze responsive electronically stored information.

These document analysis systems make use of search engines to return responsive documents from a corpus of documents. Thus, a user submits a query, and the search engine selects a set of results from the corpus based on the terms of the search query. In addition to relevancy, diversity may also be a goal of these search engines. Namely, that the search result (e.g., the documents returned as responsive to a query) not only be relevant, but that additionally these results may cover as wide a breadth as possible of the topics (e.g., terms) expressed in the search query. In many cases, then what is desired are search results that are both relevant and diverse. In this manner a user can ascertain not only which search results are relevant to his search query but additionally, a wide range of results pertinent to their search.

A microcosm of this problem occurs when searching for portions within a particular document. Often times it is desirable to determine certain portions (also referred to as a passage) of a document that may be relevant to a search. Such a determination can be useful, for example, when extracting relevant passages of a document to present to a user in association with the documents as part of search results presented to a user or, for example, when a user is reviewing documents in association with a document analysis system, such as when performing predictive coding, providing a recommendation, or performing another type of review in a document classification or analysis context. Specifically, what is desired is that both relevant and diverse passages of documents be located for a particular search query.

Heretofore, search systems have not offered such an ability. While search systems could locate passages of a document that were most relevant, they could not extract passages that were both relevant and diverse (i.e., diversely relevant) with respect to a search and, in particular could not select multiple passages from a (e.g., single) document that are quantifiably diverse from one another, but similarly relevant (e.g., to a search).

Embodiments of a document analysis system as disclosed may thus be adapted to select multiple, diverse passages of a document based on a relevance model.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIG. 3 is a flow diagram of one embodiment of a method for determining diverse and relevant passages of documents.

DETAILED DESCRIPTION

Figure 1:
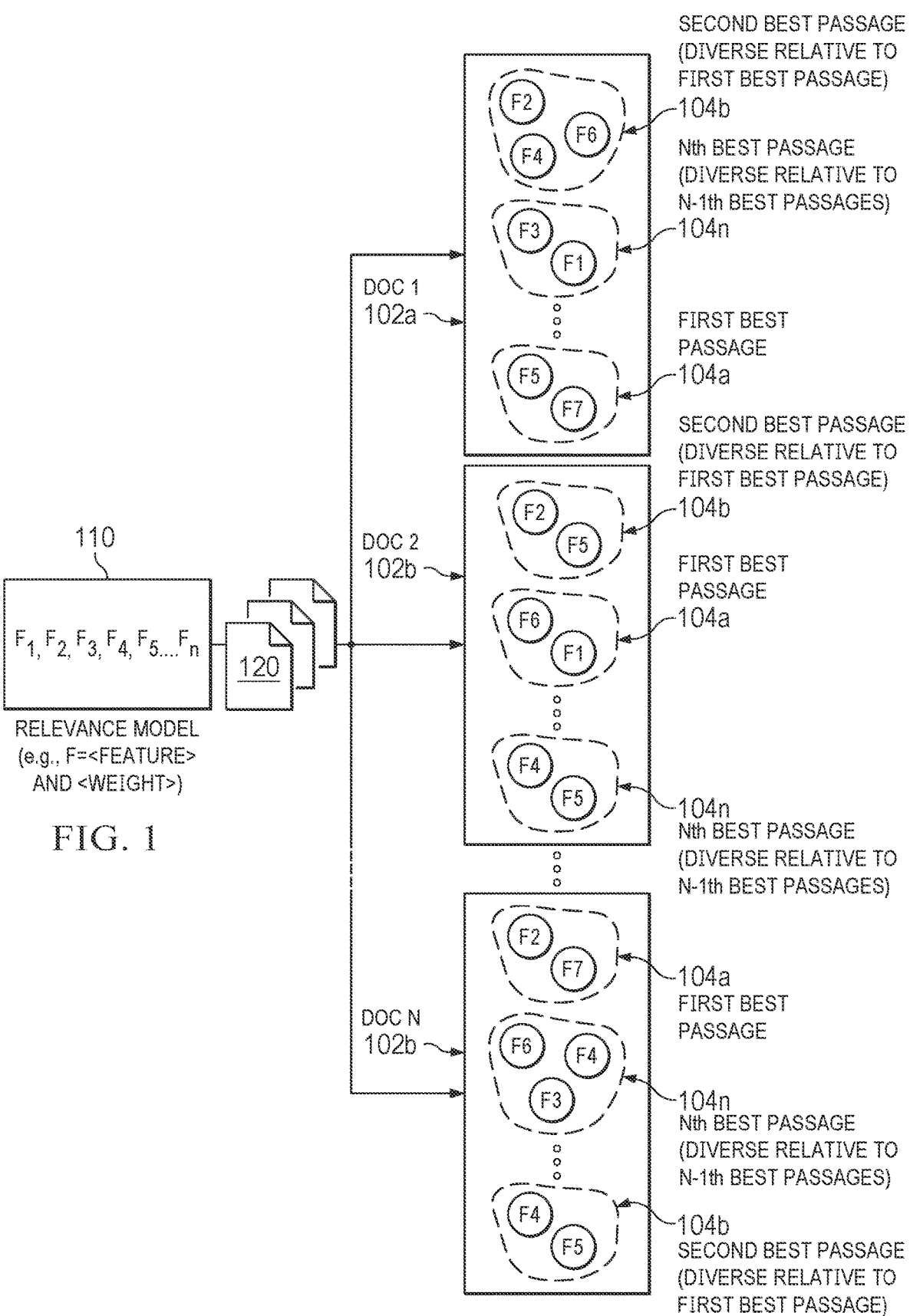
FIG. 1 is a block diagram of an embodiment of determining diverse and relevant passages of documents.

The disclosure and various features and advantageous details thereof are explained more fully with reference to the exemplary, and therefore non-limiting, embodiments illustrated in the accompanying drawings and detailed in the following description. It should be understood, however, that the detailed description and specific examples, while indicating the preferred embodiments, are given by way of illustration only and not by way of limitation. Descriptions of known programming techniques, computer software, hardware, operating platforms, and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Before describing embodiments in more detail, some context may be useful. An extremely important aspect of computing systems is the analysis or identification of relevant electronic information from a corpus of such electronic information. Search engines are thus used to search corpora of documents to return responsive electronic information of the corpus. Items of electronic information that form the corpus may be referred to interchangeably as (electronic) documents, files, objects, items, content, etc., and may include objects such as files of almost any type including documents for various editing applications, emails, workflows, images, audio files, audio/video files, etc. In a conventional search engine, a user submits a query, and the search engine selects a set of results from the corpus based on the terms of the search query. Thus, the term "document" as used herein will be understood to encompass any type of electronically stored information that may be searched, including text based documents, image based documents, audio or video based documents, or other type of documents that may include features that may be searched. It will also be apparent that a document may be formed from two or more other documents, thus the term document may also refer to the concatenation or other combination of two or more existing documents.

Accordingly, the terms of search queries usually specify (key) words, terms, phrases, logical relationships, metadata fields to be searched, synonyms, stemming variations, images or portions of images, sound clips or sound fingerprints, etc., and may be associated with the type of documents of the corpus. The search engine thus searches the documents of the corpus (e.g., an index formed from the corpus) to return responsive documents.

The performance of such search engines can be quantified in a number of ways. Most of the metrics utilized for such quantification server to quantify relevance by measuring an accuracy of the relationship between the search query and the search results. However, relevancy is not the only criteria to consider when searching. Diversity may be another goal of these search engines. Namely, that the search result cover as wide a breadth as possible of the topics (e.g., terms) expressed in the search query.

In many cases then, what is desired are search results that are both relevant and diverse. In this manner a user can ascertain not only which search results are relevant to his search query but additionally, a wide range of results pertinent to their search.

Related problems occur when searching for portions within a particular document. In many situations where search results are presented to a user it may also be desirable to determine certain portions of a document that may be relevant to a search. Such a determination can be useful, for example, when extracting relevant passages of a document to present to a user in association with the responsive documents returned for a search. As another example, it may be desired to present these types of relevant passages when a user is reviewing documents, such as when performing predictive coding, providing a recommendation, or performing another type of review in a document classification or analysis context. As can be seen, in many cases it is desired that both relevant and diverse passages of documents be located for a particular search query.

While certain search systems can locate passages of a document that were most relevant, they cannot extract passages that are both relevant and diverse (i.e., diversely relevant) with respect to a search. More particularly, current search system cannot select multiple passages from a (e.g., single) document that are quantifiably diverse from one another, but similarly relevant (e.g., to a search). It will be noted here that while the term "search" or "search query" is utilized herein in certain instances, those terms will be understood herein generally to refer to any representation (also referred to as a model) of information relevancy, and the terms "search", "search query", "relevance representation" or "relevance model" will be used herein interchangeably without loss of generality.

Embodiments of a document analysis system as disclosed may thus be adapted to select multiple, diverse passages of a document based on such a (feature) relevance model. Turning to FIG. 1 then, a block diagram of the operation of one embodiment of just such a document analysis system for use in analyzing a corpus of documents 102 is illustrated in more detail. Such documents 102 may be almost any type of electronically stored information, including text based documents, image based documents, audio or video based documents, or other type of documents.

Relevance model 110 may include a set of features (e.g., $F_1$, $F_2$, $F_3$ . . . $F_N$), where those features may have an indication of a (e.g., relative) importance of the associated feature (referred to herein without loss of generality as the weight of the feature). Such a relevance representation 110 may include, for example, a set of terms or "features" and a corresponding weight for each of the features indicating its (e.g., relative) importance in relation to the other features, or its importance in relation to the search query or other search terms. These features could be text features (e.g., words, phrases, word or phrase vectors or embeddings, named entities, sentiments, dates, etc.), image features (e.g., sets of pixel data), portions of audio data (e.g., an audio snippet or fingerprint), audio/video data, etc. Other types of features will be understood by those of ordinary skill in the art and are fully contemplated herein.

This relevance model 110 may have been determined in a number of ways. For example, it may have been generated from a search that was provided by a user through a search interface or the like (e.g., with the features determined from the search query entered by the user).

As another example, relevance model 110 may have been determined from a profile of a user. For instance, when a user interacts with a website, or across websites, data on that user may be ascertained in myriad ways to develop data associated with that user, including observing a user's behavior in interaction with a website, soliciting user input or feedback or otherwise obtaining data about a user. In this manner a user profile may be developed where the user profile can comprise data on a user's viewing or content access proclivities or habits (e.g., the user's interests), their shopping or browsing history, or other data regarding the user's interest either provided by the user or determine through observing the user's activity. A relevance model 110 can be developed from such a user profile.

Similarly, a relevance model 110 may also be determined from web analytics data determined for a user or from data provided the user themselves (e.g., by providing a description of their interests or providing ratings of various items, etc.).

A relevance model 110 may also be determined from one or more documents (e.g., documents 102 of the corpus 120 or other documents entirely). As but one example, in a predictive coding scenario a set of documents that have been assigned a certain label may be analyzed (e.g., algorithmically) to determine a set of features associated with that document (and thus the assigned label). A relevance model 110 can then be determined from these features. As will be understood, the above are only examples of how such a relevance model may be determined. Other methodologies for determining or obtaining a relevance model are possible and are fully contemplated herein.

In any event, such a relevance model 110 may include one or more features (F) along with a corresponding weight. Embodiments of a document analysis system thus may evaluate one or more documents of a corpus 120 of documents 102 using this relevance model 110 to determine multiple passages 104 of each document 102 that are diverse from one another, but similarly relevant to the features expressed in relevance model 110. A passage 104 can generally be thought of as a portion of the content of a document 102 less than the entire document 102. As the documents 102 may comprise different types of content (e.g., text, audio, image data, audio or video data, etc.) these passages may similarly comprise portions of this content, including for example, text passages (e.g., words, phrases, word or phrase vectors or embeddings, named entities, sentiments, dates, etc.), portions of an image (e.g., sets of pixel data), portions of audio data (e.g., an audio snippet or fingerprint), portions of audio/video data, etc. Other types of passages of particular types of documents 102 will be understood by those of ordinary skill in the art and are fully contemplated herein.

Specifically, an embodiment of a document analysis system may apply the features and weights of the relevance model 110 to a document 102 (e.g., to each of documents 1, 102*a*, document 2 102*b*, etc. through document 102*n*) to determine, for that document 102, passages 104 of the document 102 that are both relevant to the features expressed in the relevance model 110 but diverse relative to other determined relevant passages 104. To illustrate, an embodiment of a document analysis system may determine a first best (e.g., highest or lowest scoring according to a scoring metric) passage 104*a* for a document 102 (e.g., a passage 104 most relevant to features (F) of relevance model 110 as determined using the weights associated with those features in relevance model 110 and the content of the passage 104). A second best passages 104*b* may be determined in that document 102 (e.g., a passage 104 that is the second most relevant to features (F) of relevance model 110 as determined using the weights associated with those features in relevance model 110 and the content of the passage 104*b*) where that second best passages 104*b* is diverse from the first best passage 104*a* (e.g., may be relevant to at least one different feature (F) of the relevance model 110, or more relevant to at least one feature (F) than first best passage 104*a*).

In other words, in certain cases, the second best passage 104*b* can also include a feature (F) that the first best passage 104*a* includes. Thus, the concept of diversity does not necessarily imply complete exclusivity with respect to the features (F) to which each passages is relevant. Thus, while there may be one or more features (F) that overlap between a previously selected (nth) and a currently selected (n+kth) best passage, there are other features in each passage that ensure that the later passage (n+kth) is diverse from the former (nth) passage. The document analysis system may thus determine a set of passages 104 of a document 102 that are both relevant to relevance model 110 and diverse form one another (e.g., a Nth best passage 104*n* may be determined for a document 102, where that Nth best passage 104*n* may be diverse from the other best passages 104 determined for the document 102.

Figure 2:
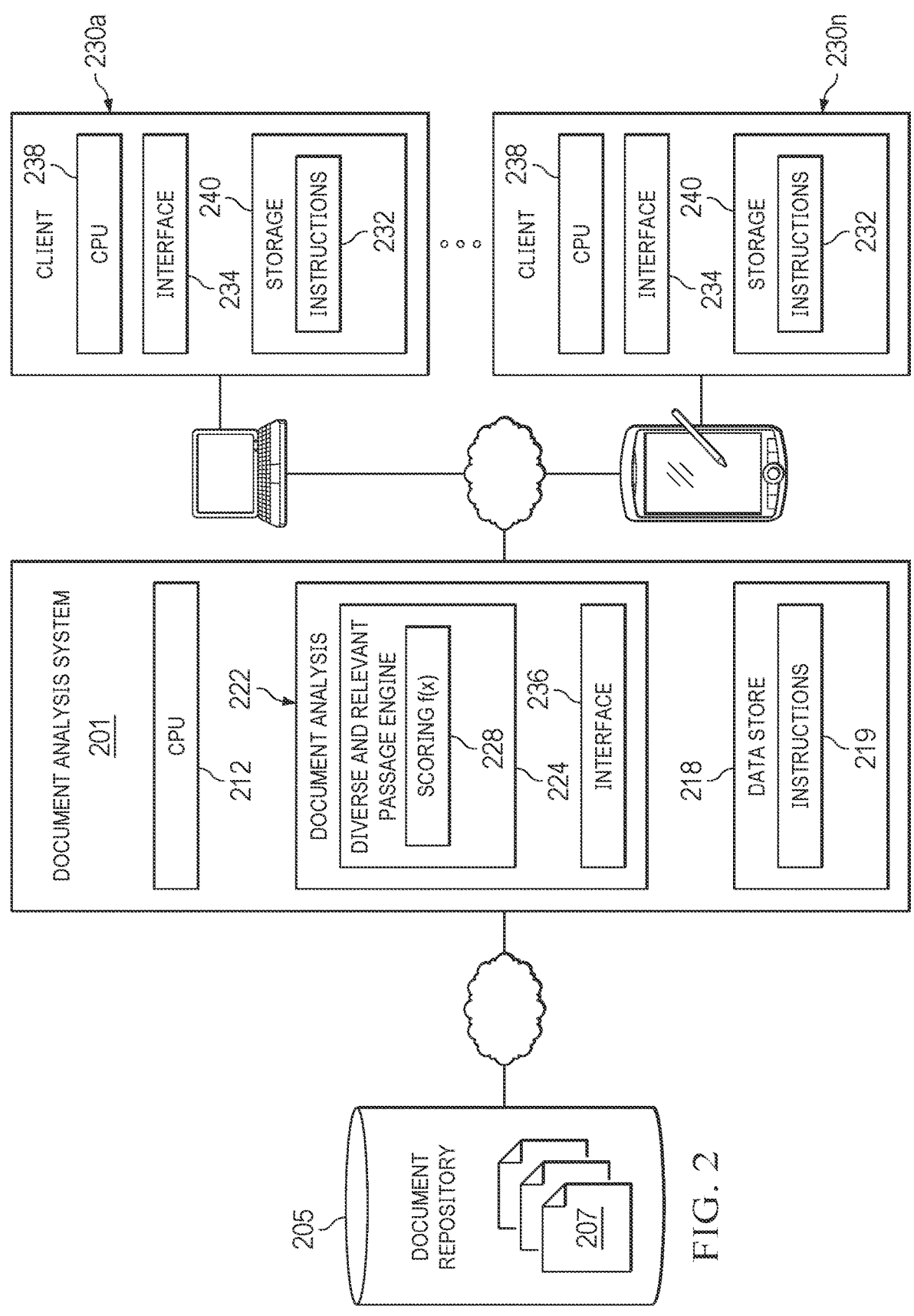
FIG. 2 is a block diagram of an embodiment of a document analysis system for determining diverse and relevant passages of documents.

Turning to FIG. 2, a block diagram of one embodiment of a document analysis system that is adapted to select. The document analysis system 201 is part of a computing environment that includes one or more repositories 205 and one or more client computers 230*a*, 230*n*. Repository 205 may comprise a file server or database system or other storage mechanism remotely or locally accessible by document analysis system 201 which, according to an embodiment, may be almost any SQL or NoSQL platform such as MongoDB, Elasticsearch or the like. Repository 205 may store documents 207 that document analysis system 201 may allow users accessing the document analysis system 201 (e.g., through clients 230) to access (e.g., navigate, search, analyze, utilize, code, generate passages for, etc.).

In the depicted embodiment, document analysis system 201 may include one or more (virtual or physical) servers or other type of computing device utilizing a central processing unit 212 connected to a memory and a data store 218 (e.g., via a bus). Central processing unit 212 may represent a single processor, multiple processors, a processor(s) with multiple processing cores and the like. Data store 218 may include a volatile or non-volatile non-transitory storage medium such as RAM, hard disk drives, flash memory devices, optical media or the like. Document analysis system 201 may be connected to a data communications network such as the Internet, a local area network (LAN), a wide area network (WAN), a cellular network or some other network or combination of networks.

Data store 218 stores computer executable instructions 219. Computer executable instructions 219 can represent one or more multiple programs or operating system instructions. In one embodiment, instructions 219 are executable to provide document analysis application 222. Again, it will be noted here that while embodiments described and depicted herein may include a deployment of a document analysis system on a physical computing device other embodiments may include the document analysis system deployed as a service on, for example, a cloud computing environment or otherwise deployed without loss of generality.

Client computer systems 230 may include components similar to those of the server of document analysis system 201, such as CPU 238 and data store 120. Additionally, client computer system 230 may include executable instructions 232 to provide user interface 234 (that may be generated or provided based on an interface 236 provided by document analysis system 201 such a browser based interface, a web services interface or another type of interface) that allows a user to interact with document analysis system 201 to, for example, search document 208 comprising the corpus or otherwise obtain diverse and relevant passages for such documents 207. These instructions 232 may have, for example, been provided by document analysis system w01 in response to an access by client computer 230. For example, user interface w34 may be provided through a web browser, file system interface or other method without loss of generality. Moreover, user interface w34 may interact (e.g., issue requests, receive responses, etc.) with a corresponding interface w36 of the document analysis engine 222, which may be, for example a web services interface, an Application Programming Interface (API) or another type of interface.

Again, those skilled in the art will appreciate that document analysis system 201 shown in FIG. 2 is merely an example of a computing system and embodiments of a document analysis system that may be implemented using other computing systems (e.g., desktop computers, laptops, mobile computing devices, services platforms, cloud computing platforms or other computing devices or platforms with adequate processing and memory) including multiple computers acting together to provide a document analysis system (e.g., a cluster of servers or other computing devices connected by a network acting together to provide the document analysis system). Similarly, client computer 230 may include any suitable desktop computer, laptop, mobile device, server, or other computing system.

The document analysis system 201 may provide diverse and relevant passage generation for documents 207 of a corpus through document analysis engine 222 (e.g., in association with interaction with a user at a client 230 through interface 234/236). Specifically, the documents 207 of the repository 205 may comprise a corpus of documents 207. A user may access (e.g., search, navigate, request summaries of, etc.) these documents 207. The document analysis system 201 may thus be able to generate a diverse and relevant set of passages for one or more of these documents 207. In one embodiment, document analysis system 201 may include diverse and relevant passage engine 224 for determining such a diverse and relevant set of passages from a document 207. Diverse and relevant passage engine 224 may determine candidate passages from a document 207 and score these candidate passages utilize a scoring function 228 to determine diverse and relevant passages for a document 207. These diverse and relevant passages can, for example, then be presented to a user (e.g., in association with the document 207 or in lieu of the document 207) or otherwise utilized.

Moving now to FIG. 3, a flow diagram on one embodiment of determining multiple relevant and diverse passages of a document is depicted. Such a method may be employed, for example, by a diverse and relevant passage engine of a document analysis system. Initially, a feature based representation of relevance may be obtained (STEP 310). This representation of relevance may include a set of features (e.g., $F_1, F_2, F_3 \ldots F_N$), where those features may have an indication of a (e.g., relative) importance of the associated feature (referred to herein without loss of generality as the weight of the feature). Such a relevance representation may include, for example, a set of terms or "features" and a corresponding weight for each of the features indicating its (e.g., relative) importance in relation to the other features or in relation to the search query or other search terms. These features could be text features (e.g., words, phrases, word or phrase vectors or embeddings, named entities, sentiments, dates, etc.), image features (e.g., sets of pixel data), portions of audio data (e.g., an audio snippet or fingerprint), audio/video data, etc. Other types of features will be understood by those of ordinary skill in the art and are fully contemplated herein.

Each feature may also be associated with a relevance weight. Such a relevance weight may be a score from 0 to 1 or from −1 to 1 (or any other desired weighting schemes as are known in the art) indicating the (e.g., relative) importance of the associated feature. Similar to the features themselves, the weightings may be determined based on a (e.g., ad hoc) search query, an interactive search session, a recommender system in which the user is interacting with items of interest, a user profile, or otherwise.

A document for which it is desired to determine relevant and diverse passages can then be obtained (STEP 320). This document may, for example, be a document that will be presented or has been selected in association with a user's activities with a document analysis system (e.g., is responsive to a search, has been predictively coded with a certain label, etc.). Additionally, the document could be one selected at random. Or it could be the one next in a relevance-ordered queue. Or it could be one selected that is as far outside of the user's current ken as possible (e.g., a novel or diverse document from another document such as one previously accessed by a user). Other methods of selecting a document are possible and are fully contemplated herein.

A relevant feature set associated with the document can then be determined. Specifically, a position of each feature of the relevance model in the obtained document can be determined (STEP 330). Such a position for a feature can be abstract (e.g., the k-th word in the document) or it can be concrete/physical (e.g., the <x,y> coordinates of a feature in a 2 dimensional document layout). In one embodiment, a positional offset in the document of each feature in the obtained relevance model may be determined or otherwise obtained. In many cases, one or more indexes may be maintained (or determined) for documents in a document analysis system. Such an index may include data on the features included in each document (e.g., both those that are in the relevance model and features in the document that are not included in the relevance model), and the positions in the document of each of these features. These positions can, for example, be offsets from the first feature or beginning of the document (e.g., position 4 will be the fourth feature, word, phrase, etc. in the document). From such an index, including the features and positions of those features, a positional offset of features from the relevance model in the obtained document may be determined.

For example, suppose the obtained relevance model includes features "U", "V", "W", "X", "Y" and "Z", and that the obtained document contains features W, X, Y, and Z from that relevance model. Those features might be found at the following positions in the document (in this example, the feature X is found at positions 14, 19, and 106, feature W is found at position 42, feature Y us found at position 44 and 90 and feature Z is found at position 47 in the document):

| Feature | Position |
|---------|----------|
| X | 14 |
| X | 19 |

-continued

| Feature | Position |
|---|---|
| W | 42 |
| Y | 44 |
| Z | 47 |
| Y | 90 |
| X | 106 |

The feature weights for those features of the relevance model included in the document can then be determined and associated with each of the respective features (STEP 340). Continuing with the above example, suppose the features W, X, Y, and Z have the respective weights 0.7, 0.3, 0.8 and 0.1:

| Feature | Relevance Weight | Position |
|---|---|---|
| X | 0.3 | 14 |
| X | 0.3 | 19 |
| W | 0.7 | 42 |
| Y | 0.8 | 44 |
| Z | 0.1 | 47 |
| Y | 0.8 | 90 |
| X | 0.3 | 106 |

Candidate passages of the document can then be determined (STEP 350). As noted, these passages may be various portions of the content of the document that are less than the entire document. These candidate passages may be determined using a wide variety of techniques based on the features of the relevance model found in the document, or irrespective of the presence or positions of such features.

In one embodiment, passages may be determined based on the features of the relevance model and a proximity or number of those features in the document. As but one example, a passage may be determined based on the presence of features and their positions within the document by determining positional ranges of the document with a number (e.g., 3, 5, etc.) of relevant features. Such a determination may be made by iterating or sweeping through the set of features (of the relevance model) determined for the document and their determined positions to determine candidate passages with a threshold number (e.g., a "window size") of the features within them. Specifically, iterating through each feature of the relevant feature set determined for the document it can be determined for that relevant feature of the document if there are more than the threshold number (e.g., the threshold number minus one) of relevant features that follow that feature in the document using the relevant feature set and the associated positional indicators for those relevant features. If so, a candidate passage comprising that relevant feature and the following (threshold number minus one) relevant features in the document (and their positional indicators) may be added to the set of candidate passages.

Accordingly, the set of candidate passages can be any portion of the content of the document that includes a different set of that number of features where a candidate passage may be defined the positional range from the occurrence a first of the number of features to a last of the number of features of the candidate passage.

Again, continuing with the above example, assume a window of size 3 (e.g., features) is applied to the relevant feature set found for the example document. The application of such a window size would thus yield five candidate passages, (here labeled (a) through (e)):

| Feature | Relevance Weight | Position |
|---|---|---|
| | (a) | |
| X | 0.3 | 14 |
| X | 0.3 | 19 |
| W | 0.7 | 42 |
| | (b) | |
| X | 0.3 | 19 |
| W | 0.7 | 42 |
| Y | 0.8 | 44 |
| | (c) | |
| W | 0.7 | 42 |
| Y | 0.8 | 44 |
| Z | 0.1 | 47 |
| | (d) | |
| Y | 0.8 | 44 |
| Z | 0.1 | 47 |
| Y | 0.8 | 90 |
| | (e) | |
| Z | 0.1 | 47 |
| Y | 0.8 | 90 |
| X | 0.3 | 106 |

Each of these candidate passages can then be scored (STEP 360). Such a score may be based on the relevancy of that passage based on the obtained relevance model. For example, the score is a combination of the weights of the features of that candidate passage (e.g., as determined from the relevancy model), the uniqueness of the features of the features of the passage and a passage spread. One embodiment of formula for this is:

$$\Sigma w * uniq / spread$$

where w is the weight for each feature (e.g., as in the relevancy model), uniq is the number of unique (different) features in the candidate passage, and spread is the positional distance (e.g., difference) between the beginning and end of the passage (e.g., the position of the last relevant feature of the passage minus the position of the first relevant feature of the passage).

For example, for candidate passage (a) above, the sum of the weights would be (0.3+0.3+0.7), the uniq value would be 2 (even though there are three features in caudate passage (a), there are only two unique features, X and W, as X occurs twice), and the spread would be (42–14)=28 (e.g., the position of the last relevant feature of the passage (here W at position 42) minus the position of the first relevant feature of the passage (here X at position 14)). So, the score for candidate passage (a) would be 1.3*2/28=0.0929.

Calculating the score for each of the candidate passages of the example would thus result in the following scores:

| Passage | Score |
|---|---|
| (a) | 0.114 |
| (b) | 0.216 |
| (c) | 0.96 |
| (d) | 0.074 |
| (e) | 0.041 |

Once the scores for each of the candidate passages are determined, the best (e.g., most relevant) candidate passage can be selected based on the score (STEP 370) and the selected best candidate passage added to a list of relevant and diverse passages (STEP 380). This selected best passage may just be the highest scored candidate passage in one embodiment. Again, with respect to the example above, example (c) may be selected as the best candidate passage and added to a list of relevant and diverse passages as it has the highest score (e.g., because it has the highest concentration of highly weighted unique terms).

At this point it can be determined if there are a desired number of diversely relevant passages for the document (STEP 382). If there are a desired number of relevant and diverse passages (Y branch of STEP 382), the list of diverse and relevant passages may be returned or presented (e.g., to a user in association with the document) (STEP 384).

If there are not a desired number of relevant and diverse passages (N branch of STEP 382) one or more additional relevant passages may be determined and added to the list of diverse and relevant passages where those additional relevant passages may be diverse from one or more other passages of the list. In one embodiment then, diversity may be introduced into the next (e.g., second or subsequent) selected relevant passage from the candidate passages by discounting the features that were already present in the other (e.g., first, or previous) selected candidate passage(s), and (re)scoring and selecting another candidate passage to add to the list of diverse and relevant passages.

In particular, the relevant features of the best selected candidate passage (e.g., that was added to the list of diverse and relevant passages) may be determined (STEP 386). The (e.g., current) weights of the features of the document may then be adjusted based on these determined features (e.g., the features included in the just selected best candidate passage) (STEP 390) before a subsequent scoring and selection process. For example, the weights of the features for the document may be adjusted by simply setting the weights of the relevant features of the selected candidate passages to zero or may be adjusted by setting them to a negative, or reducing the weights by some other margin, which may be a fixed adjustment, a scaled adjustment or an algorithmically determined adjustment based on one or more parameters.

Once the weighting of the features of the document are adjusted based on the features of the selected best candidate passage, each of the determined candidate passages for the document can again be scored (STEP 360). Here, the score of the candidate passages may now be determined based on the adjusted weights for the features. Additionally, those features may be excluded in other aspect when determining the score of the candidate passages. For example, these features may also not be included when determining the uniqueness value when scoring a candidate passage.

Once the scores for each of the candidate passages are again determined, the current best (e.g., most relevant) candidate passage can be selected based on the score (STEP 370) and the current selected best candidate passage added to the list of relevant and diverse passages (STEP 380).

Subsequent best passages can be selected by repeating the previous steps: adjusting (e.g., zeroing out) relevance feature weights already included in previously selected candidate passages, and performing the scoring and selection steps using the adjusted weights. This selection process may continue indefinitely, or until some threshold is met (e.g., Y branch of STEP 382), such as a certain number of passages selected, or a certain percentage of the document text is covered.

It will be noted that embodiments as disclosed may encompass other techniques for determining how many diverse passages to select based on criteria like the amount of information gained (e.g., informational entropy reduced) in each newly selected candidate passage or other passage selection techniques that can be used for passage selection and passage diversification.

Still referring to the above example, recall that these were the initial positions of the relevant features of the relevance model present in the example document along with their initial weights as defined in the relevancy model:

| Feature | Relevance Weight | Position |
|---|---|---|
| X | 0.3 | 14 |
| X | 0.3 | 19 |
| W | 0.7 | 42 |
| Y | 0.8 | 44 |
| Z | 0.1 | 47 |
| Y | 0.8 | 90 |
| X | 0.3 | 106 |

The initial passage selected as the best passage after the initial scoring of the candidate passages was passage (c):

| (c) | | |
|---|---|---|
| Feature | Relevance Weight | Position |
| W | 0.7 | 42 |
| Y | 0.8 | 44 |
| Z | 0.1 | 47 |

The relevant features of the selected passage (c) are thus highlighted (e.g., "W", "Y" and "Z") below:

| Feature | Relevance Weight | Position |
|---|---|---|
| X | 0.3 | 14 |
| X | 0.3 | 19 |
| W | 0.7 | 42 |
| Y | 0.8 | 44 |
| Z | 0.1 | 47 |
| Y | 0.8 | 90 |
| X | 0.3 | 106 |

Thus, the weights of the relevant features (here, W, Y and Z) of selected passage (c) may be adjusted (e.g., by setting them to zero), which yields the following:

| Feature | Relevance Weight | Position |
|---|---|---|
| X | 0.3 | 14 |
| X | 0.3 | 19 |
| W | 0 | 42 |
| Y | 0 | 44 |
| Z | 0 | 47 |
| Y | 0 | 90 |
| X | 0.3 | 106 |

Notice here, the weights of all the features (e.g., W, Y and Z) found in the previously selected best passage (e.g., here (c)) may be adjusted (e.g., set to zero) for all occurrences of that feature even when they occur outside the selected best passage (e.g., the weights of W, Y and Z may be set to zero across the entire document). Again, as noted above, these features may also not be included when determining the uniqueness value when scoring a candidate passage.

Each of the candidate passages can then be scored based on the current weights (e.g., as adjusted) of the features of that candidate passage, the uniqueness of the features of the features of the passage (where the zero weight features may not be used to determine such uniqueness) and a passage spread. So, for the above example, the scores for each passage candidate passage after the weights have been adjusted are as follows:

| Passage | Score |
|---------|-------|
| (a) | 0.0214 |
| (b) | 0.012 |
| (c) | 0 |
| (d) | 0 |
| (e) | 0.0051 |

As can be seen, in this example, the (e.g., second) best passage is now actually passage (a), between positions 14 and 19 in the document where that current (e.g., second) best passage (a) is diverse from the first best passage (c). This selected (e.g., second) best passage may then be added to the list of diverse and relevant passages.

In some embodiments, additional action may be taken based on the positions of the features in a subsequently determined best candidate passage. For example, if the positions of features overlap between two selected candidate passages, they may be concatenated or displayed severalty. For example, as this diverse, (second) best passage (a) comprising features at positions 14 to 19 does not overlap with the first best passage (c) which ranges from positions 42 to 47 they may be added to the list of relevant and diverse passages as separate passages. However, the second or other selected best passage might be connected or overlap positionally with the first best passage.

Therefore, when adding selected passage to the list of diverse and relevant passage (e.g., or displaying the passages to the user), there are many ways of handling this overlap. The (e.g., second) or other subsequent passage can be concatenated to a previously selected (e.g., first) passage, or added or displayed separately. Or the passages could be displayed together, but with the one selected (e.g., first) passage in one color, and the different portions of the other (e.g., second) best passage in a different color, or any number of other possibilities such as one (e.g., a first) passage in yellow, the other (e.g., second) best passage in blue, and the overlapping section in a blue-yellow mixture, aka green.

Referring again to FIG. 1 and to FIG. 2, in another embodiment, a document analysis system operates to conduct content relevance searches comprising receiving content 120 and a relevance model 110 related to the content 120, the relevance model 110 comprising a plurality of features (e.g., $F_1$, $F_2$, $F_3$ . . . $F_N$) and a relevance value for each feature. The system processes the content 120 to generate search results which comprise one or more of the features in the relevance model 110.

An initial score is generated 228 for the each of the search results based on the features in the search results and the relevance value of the features in the search results. One of the search results is selected as an initial search result based on the initial scores. For example, the system may rank the initial scores of each of the search results, from high to low, wherein the higher the initial score, the more relevance the search result, and set the initial search result to the search result with the highest score. In this way, the initial search result can be said to be the first best relevant result 104a (as depicted in FIG. 1) in the content 120.

The system modifies the relevance values of the features in the initial search result. This may include reducing the relevance value of each feature in the first best relevant passage 104a. For example, the relevance value may be a number in the range of 0.0 to 1.0, where the higher the number, the more relevant the searched for feature in the relevance model 110. In this example, the relevance values of the features in the initial search result may be reduced by a fraction, such as by 0.1, or even set to a value of 0.0.

The system continues to process the content the determine subsequent scores of each of the search results based on the modified relevance values for the features in the first best relevant result 104a. This determines a subsequent search result, which (as in the above example) may be the search result with the highest subsequent score (FIG. 2, the second-best passage 104b). Reducing the relevance value of the features in the initial search result effectively reduces the likelihood that the "zeroed-out" features will appear in subsequent search results with the highest relevance scores. In this way, the document analysis system effectively and advantageously produces a diverse set of relevant search results.

It should be noted that in some embodiments the relevance values for each feature found in the initial search result may be increased, based on whether the goal of the search was to find search results that did not include the features. Here, the lowest scoring search result may be the most desirable. Furthermore, iterations of searches could include finding the most diversely relevant search results followed by searches to find the most diversely irrelevant search results. This could be the case if the goal were to find search results that included desired (relevant) features but not undesired (irrelevant) features.

It should further be noted that the document analysis system could include logic to consider content that is lexically related to the features. When features are returned in a search result, in addition to demoting the features, the lexically related content would also be demoted, in the subsequent search results. In this way, diversely relevant search results not only act on "direct" features in the relevance model, but also "indirect" features similar or related to the direct features. Expanding feature scope in this way may produce more meaningful, "fuzzy" search results.

In other embodiments, reducing the relevance values for the features found in search results may be based on the number of times the feature occurs within a search result. Here, if the feature was found once in a search result, it would be demoted less than if the feature was found 4 times in a search result.

Figure 4A:
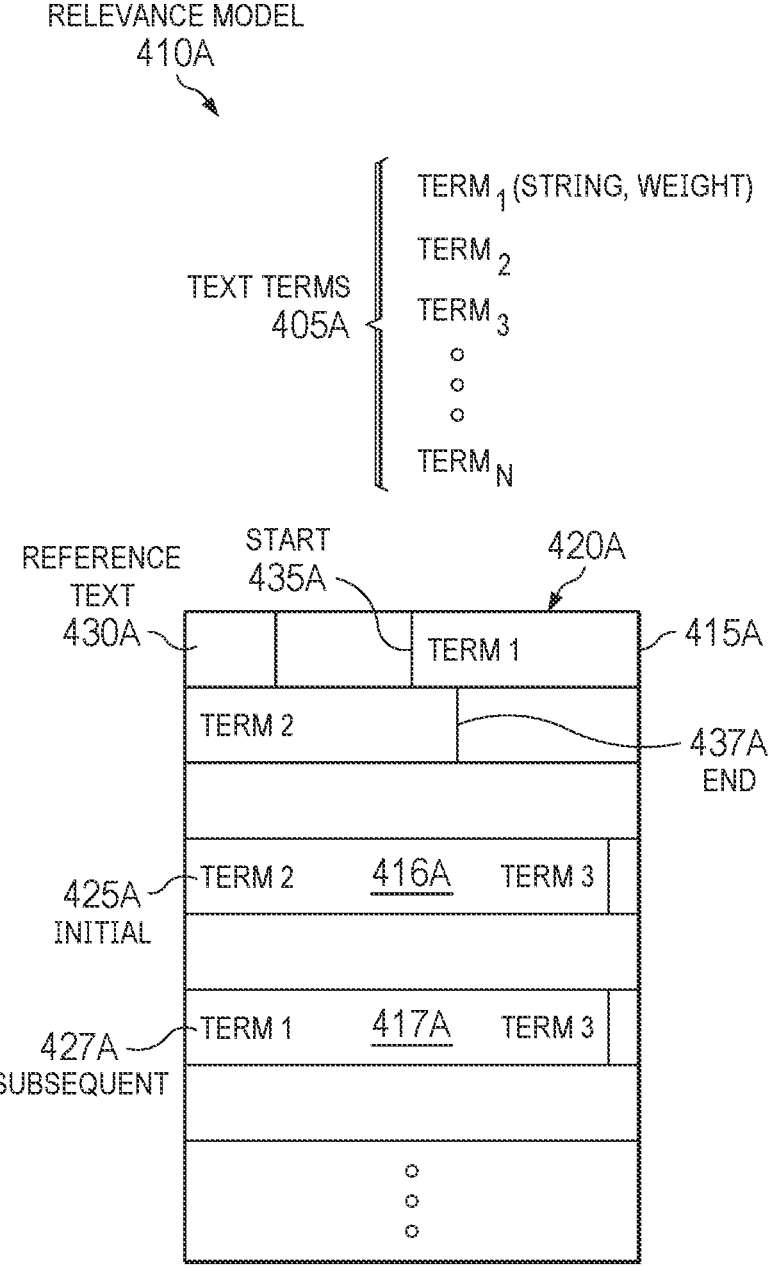
FIGS. 4A, 4B, 4C and 4D depict embodiments of a document analysis system or operations thereof.

Referring now to FIGS. 4A, 4B, 4C and 4D, in further embodiments, the content 120 is in the format of a text document, an image file, an audio file, or an audio-visual file. In embodiments wherein the content comprises a text document, the search results comprise passages of text and the features of the relevance model comprise text terms. In FIG. 4A, relevance model 410A includes text terms 405A ($TERM_1$, $TERM_2$, $TERM_3$ . . . $TERM_N$) each defined by a string and a relevance value (which, in some embodiments, is a WEIGHT value as in FIG. 4A). The text document 420A includes passages of text which are the search results 415A, 416A, 417A, each including one or more of the text terms 405A. As can be seen in FIG. 4A, the text document 420A is parsed to find a number of the text terms 405A within portions of the text document. The number of text terms may be defined, as in one text term per search result, two text terms per search result, 3, 4, and so on. For example, two text terms are found in search result 415A, etc. Furthermore, the content may be parsed to find different numbers of features per search result, such as, first find all passages with 4 of the features, then 3, then 2, and so on. An initial search result 425A includes the search result with the highest initial score, and a subsequent search result 427A includes the search result with the highest subsequent score, after reducing the weight values of the text terms found in the initial search result 425A.

In some embodiments, each search result is defined by a starting position in the text 435A and an ending position in the text 437A (such as in search result 415A), relative to reference text 430A. The scores for each of the search results 415A, 416A, 417A are further based on a positional spread value of each passage of text computed based on the difference between the ending position 437A of the last character in each passage relative to a reference text position 430A in the text document 420A and a starting position 435A of the first character in each passage relative to the reference text 430A in the text document 420A.

Figure 4B:
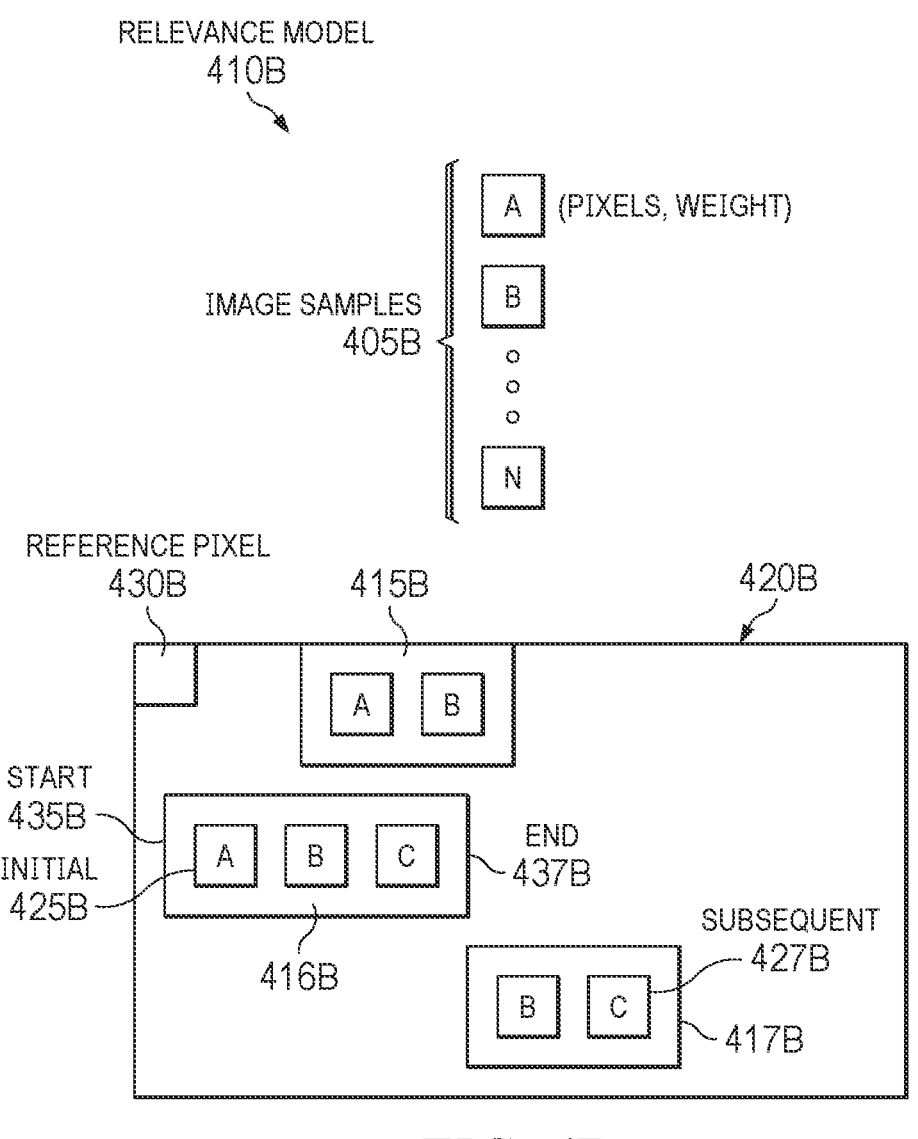

In embodiments wherein the content comprises an image file, the search results comprise groupings of pixels of the image file and the features of the relevance model comprise image samples. In FIG. 4B, relevance model 410B includes image samples 405B (A, B . . . N) each defined by pixels and a relevance value (which, in some embodiments, is a WEIGHT value as in FIG. 4B). The image file 420B includes groupings of pixels which are the search results 415B, 416B, 417B, each including one or more of the pixel samples 405B. As can be seen in FIG. 4B, the image file 420B is processed to find a number of the image samples 405B within the image file. The number of image samples may be defined, as in one image sample per search result, two image samples per search result, 3, 4, and so on. For example, two image samples are found in search result 415B, etc. An initial search result 425B includes the grouping of pixels with the highest initial score, and a subsequent search result 427B includes the grouping of pixels with the highest subsequent score, after reducing the weight values of the image samples found in the initial search result 425B.

In some embodiments, each search result is defined by a starting position in the image 435B and an ending position in the image 437B of a search result (such as search result 416B), relative to reference pixel 430B. The scores for each of the search results 415B, 416B, 417B are further based on a positional spread value of each search result computed based on the difference between the ending position 437B of the last pixel in each search result relative to a reference pixel position 430B in the image file 420B and a starting pixel 435B of the first pixel in each search result relative to the reference pixel 430B in the image file 420B.

Figure 4C:
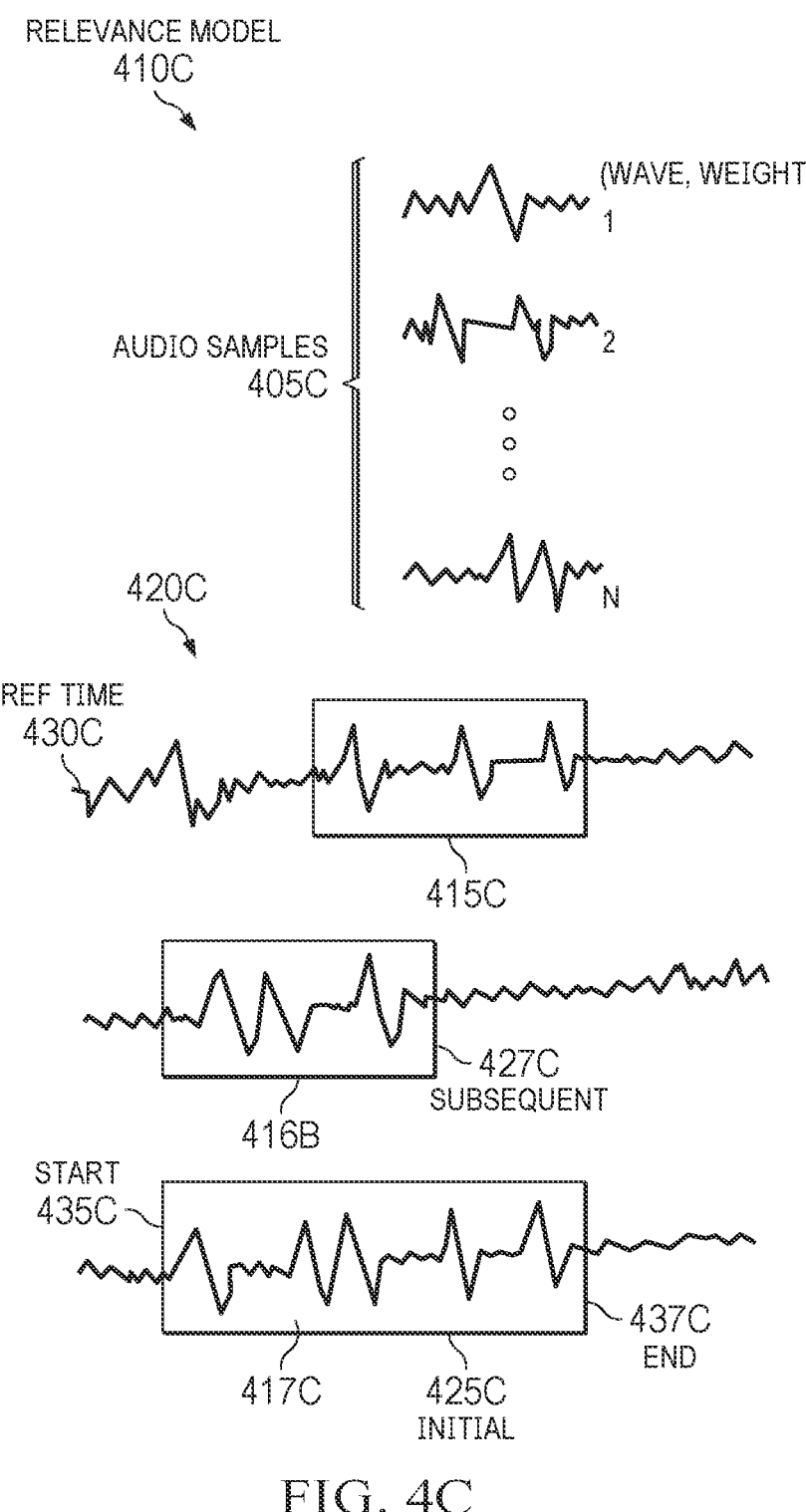

In embodiments wherein the content comprises an audio file, the search results comprise audio snippets of the audio file and the features of the relevance model comprise audio samples. In FIG. 4C, relevance model 410C includes audio samples 405C (denoted by the example audio waves) each defined by audio samples and a relevance value (which, in some embodiments, is a WEIGHT value as in FIG. 4C). The audio file 420C includes audio waves which are the search results 415C, 416C, 417C, each including one or more of the audio samples 405C. As can be seen in FIG. 4C, the audio file 420C is processed to find a number of the audio samples 405C within the audio file 420C. The number of audio samples 405C may be defined, as in one audio sample per search result, two audio samples per search result, 3, 4, and so on. For example, two audio samples are found in search result 415C, etc. An initial search result 425C includes the search result with the highest initial score, and a subsequent search result 427C includes the search result with the highest subsequent score, after reducing the weight values of the audio samples found in the initial search result 425C.

In some embodiments, each search result is defined by a starting position in the audio file 435C and an ending position in the audio file 437C (such as search result 417C), relative to reference audio position 430C. The scores for each of the search results 415C, 416C, 417C are further based on a positional spread value of each search result computed based on the difference between the ending position 437C of the last audio position in each search result relative to a reference audio position 430C in the audio file 420C and a starting audio position 435C of the first audio position in each search result relative to the reference audio position 430C in the audio file 420C.

Figure 4D:
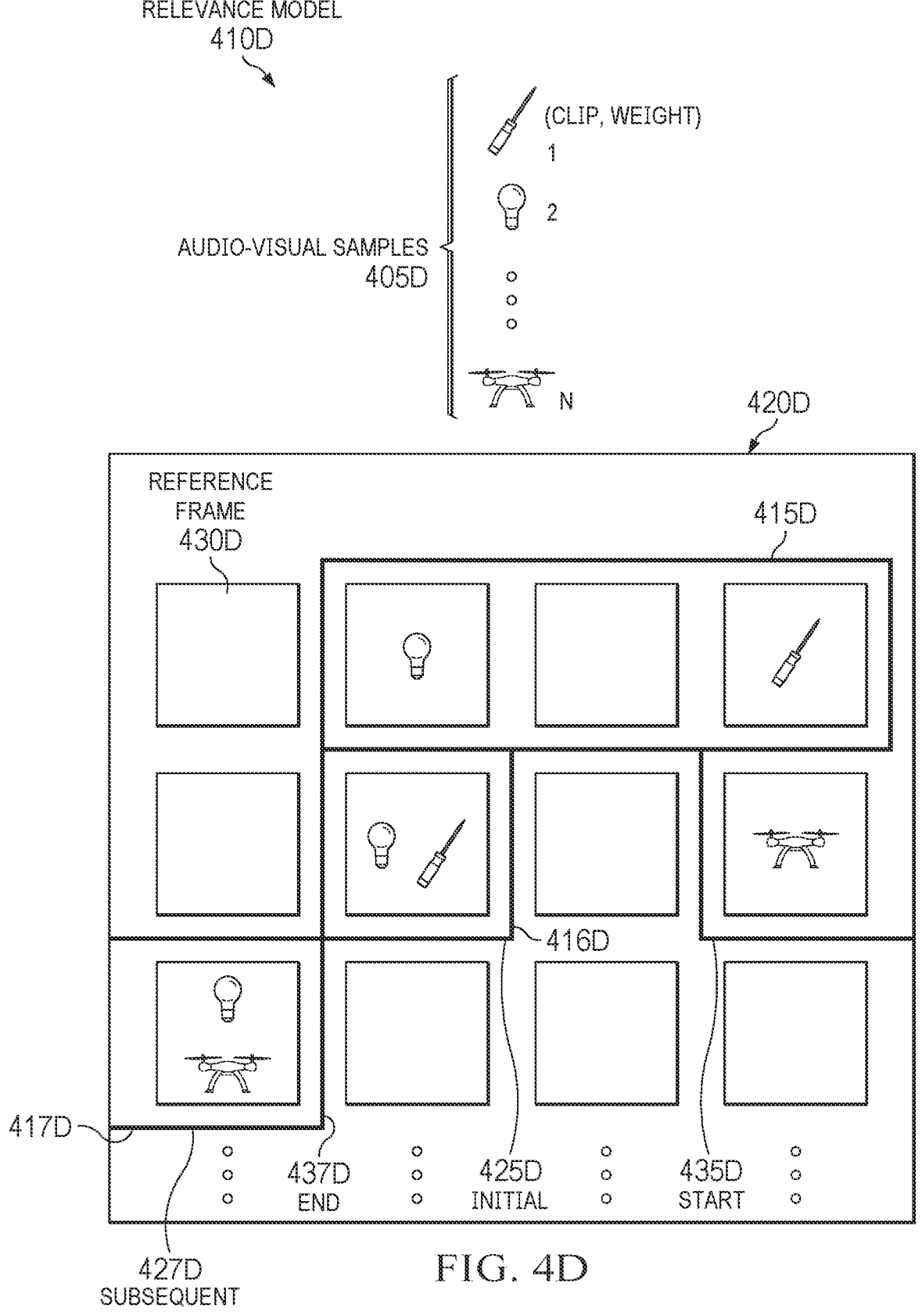

In embodiments wherein the content comprises an audio-visual file, the search results comprise audio-visual snippets of the audio-visual file and the features of the relevance model comprise audio-visual samples. In FIG. 4D, relevance model 410D includes audio-visual samples 405D (denoted by the example diagrams) each defined by audio-visual samples or clips and a relevance value (which, in some embodiments, is a WEIGHT value as in FIG. 4D). The audio-visual file 420D includes audio-visual frames which are the search results 415D, 416D, 417D, each including one or more of the audio-visual samples 405D. As can be seen in FIG. 4D, the audio-visual file 420D is processed to find a number of the audio-visual samples 405D within the audio-visual file. The number of audio-visual samples 405D may be defined, as in one audio-visual sample per search result, two audio-visual samples per search result, 3, 4, and so on. For example, two audio-visual samples are found in search result 415D, etc. An initial search result 425D includes the search result with the highest initial score, and a subsequent search result 427D includes the search result with the highest subsequent score, after reducing the weight values of the audio-visual samples found in the initial search result 425D.

In some embodiments, each search result is defined by a starting frame in the audio-visual file 435D and an ending frame in the audio-visual file 437D, relative to reference audio-visual frame 430D. The scores for each of the search results 415D, 416D, 417D are further based on a positional spread value of each search result computed based on the difference between the ending frame 437D of the last audio-visual frame in each search result (such as search result 417D) relative to a reference audio-visual frame 430D in the audio-visual file 420D and a starting audio-visual frame 435D of the first audio-visual frame in each search result relative to the reference audio-visual frame 430D in the audio-visual file 420D.

Some embodiments of the document analysis system include iterating the processing of the search results including generating an iterative score for each of the search results based on the one or more features of each of the search results and the relevance value of the one of more features of each of the search results. Here, based on generating of the iterative score for each of the search results, a next iterative search result with the highest score is selected. The relevance value of each of the features comprised in the next iterative search result is modified, which may include reducing the relevance value of each respective feature comprised in the next iterative search result. The iterative process may be repeated by a predefined number of iterations or until a desired number of relevance search results is found.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein. Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a CPU, at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can be executed on a single computer processing device or multiple computer processing devices, a single computer processor or multiple computer processors. Data may be stored in a single storage medium or distributed through multiple storage mediums and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, HDs, data cartridges, magnetic tapes, floppy diskettes, flash memory drives, optical data storage devices, CD-ROMs, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any hardware system, mechanism or component that processes data, signals or other information. A processor can include a system with a general-purpose CPU, multiple processing units, dedicated circuitry for achieving functionality, or other systems. Processing need not be limited to a geographic location or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present), and B is false (or not present), A is false (or not present) and B is true (or present), and both A and B are true (or present). As used herein, that follow, a term preceded by "a set", "a" or "an" (and "the" when antecedent basis is "a" or "an") includes both singular and plural of such term, unless clearly indicated otherwise (i.e., that the reference "a set", "a" or "an" clearly indicates only the singular or only the plural). Also, as used in the description herein the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure.

What is claimed is:

1. A system for content relevance search comprising:
a processor;
a non-transitory computer readable medium, comprising instructions for:
receiving content and a relevance model related to the content, the relevance model comprising:
a plurality of features; and
a relevance value weight for each feature;
processing the content to generate a plurality of search results based on the plurality of features in the relevance model, each of the search results comprising one or more of the features in the relevance model;
generating an initial score for each of the search results using the relevance model, the initial score for each of the search results being calculated by:
determining a sum of the relevance value weights of the one or more features comprised in the search result;
multiplying the sum by a number of unique features within the search result, thereby generating a multiplied sum; and
dividing the multiplied sum by a positional spread value, the positional spread value determined based on a distance between a first position of a first feature in the search result and a second position of a second feature in the search result, wherein the number of unique features comprise the first and second features;
based on the generation of the initial score for each search result, selecting an initial one of the search results;
modifying the relevance value weight of each feature comprised in the initial one of the search results, by reducing the relevance value weight of each feature comprised in the initial one of the search results;
generating a subsequent score for each search result other than the initial one of the search results, wherein the subsequent score for each search result of the remaining search results is generated using the relevance model and based on:

the one or more features comprised in each remaining search result;

the number of unique features within each remaining search result;

the positional spread of features within each remaining search result; and the relevance value weights of the one of more features comprised in each remaining search result, the relevance value weights being sourced from the relevance model, wherein the relevance model incorporates the relevance value weight of each feature that was comprised in the initial one of the search results; and based on the generation of the subsequent score for each remaining search result, selecting a subsequent search result from all of the remaining search results, the subsequent search result and the initial search result characterized by diverse and relevant ones of the features.

2. The system of claim 1, wherein the content comprises a text document, an image file, an audio file, or an audio-visual file, wherein:

when the content comprises a text document, the plurality of search results comprises passages of text and the features of the relevance model comprise text terms; and when the content comprises an image file, the plurality of search results comprises a grouping of pixels of the image file and the features of the relevance model comprise image samples;

when the content comprises an audio file, the plurality of search results comprises audio snippets and the features of the relevance model comprise audio samples; and when the content comprises an audio-visual file, the plurality of search results comprises audio-visual snippets and the features of the relevance model comprise audio-visual samples.

3. The system of claim 2, wherein when the content comprises a text document, the initial score for each of the search results is further based on the positional spread value of each passage of text computed based on the difference between a position of the last character in each passage relative to a reference text position in the text document and a position of the first character in each passage relative to the reference text in the text document.

4. The system of claim 1, wherein content comprises a text document and the plurality of search results comprises passages of text and the features of the relevance model comprise text terms, and the search results are computed based on parsing the text document to find a number of the text terms within the text document.

5. The system of claim 4, wherein the text terms in the initial search result and the text terms in the subsequent search result are different thereby producing diverse relevant text terms between the initial search result and subsequent search result.

6. The system of claim 1, wherein modifying the relevance value weight of each of the features comprised in the initial search result comprises setting the relevance value weight of each of the features comprised in the initial search result to zero.

7. The system of claim 1, further comprising:

iterating the processing of the search results comprising:

generating an iterative score for each of the search results based on the one or more features of each of the search results and the relevance value weight of the one of more features of each of the search results;

based on generating of the iterative score for each of the search results, selecting a next iterative search result;

modifying the relevance value weight of each of the features comprised in the next iterative search result, the modifying of the relevance value weight reducing the relevance of each respective feature comprised in the next iterative search result;

repeating, a predefined number of iterations, the iterating the processing of the plurality of search results.

8. A method for content relevance search, comprising:

receiving content and a relevance model related to the content, the relevance model comprising:

a plurality of features; and a relevance value weight for each feature;

processing the content to generate a plurality of search results based on the plurality of features in the relevance model, each of the search results comprising one or more of the features in the relevance model;

generating an initial score for each of the search results using the relevance model, the initial score for each of the search results being calculated by:

determining a sum of the relevance value weights of the one or more features comprised in the search result;

multiplying the sum by a number of unique features within the search result, thereby generating a multiplied sum; and dividing the multiplied sum by a positional spread value, the positional spread value determined based on a distance between a first position of a first feature in the search result and a second position of a second feature in the search result, wherein the number of unique features comprise the first and second features;

based on the generation of the initial score for each search result, selecting an initial one of the search results;

modifying the relevance value weight of each feature comprised in the initial one of the search results, by the relevance value weight of each feature comprised in the initial one of the search results;

generating a subsequent score for each search result other than the initial one of the search results, wherein the subsequent score for each search result of the remaining search results is generated using the relevance mode and is based on:

the one or more features comprised in each remaining search result;

the number of unique features within each remaining search result;

the positional spread of features within each remaining search result; and the relevance value weights of the one of more features comprised in each remaining search result, the relevance value weights being sourced from the relevance model, wherein the relevance model incorporates the relevance value weight of each feature that was comprised in the initial one of the search results; and based on the generation of the subsequent score for each remaining search result, selecting a subsequent search result from all of the remaining search results, the subsequent search result and the initial search result characterized by diverse and relevant ones of the features.

9. The method of claim 8, wherein the content comprises a text document, an image file, an audio file, or an audio-visual file, wherein:

when the content comprises a text document, the plurality of search results comprises passages of text and the features of the relevance model comprise text terms; and when the content comprises an image file, the plurality of search results comprises a grouping of pixels of the image file and the features of the relevance model comprise image samples;

when the content comprises an audio file, the plurality of search results comprises audio snippets and the features of the relevance model comprise audio samples; and when the content comprises an audio-visual file, the plurality of search results comprises audio-visual snippets and the features of the relevance model comprise audio-visual samples.

10. The method of claim 9, wherein when the content comprises a text document, the initial score for each of the search results is further based on the positional spread value of each passage of text computed based on the difference between a position of the last character in each passage relative to a reference text position in the text document and a position of the first character in each passage relative to the reference text in the text document.

11. The method of claim 8, wherein content comprises a text document and the plurality of search results comprises passages of text and the features of the relevance model comprise text terms, and the search results are computed based on parsing the text document to find a number of the text terms within the text document.

12. The method of claim 11, wherein the text terms in the initial search result and the text terms in the subsequent search result are different thereby producing diverse relevant text terms between the initial search result and subsequent search result.

13. The method of claim 8, wherein modifying the relevance value weight of each of the features comprised in the initial search result comprises setting the relevance value weight of each of the features comprised in the initial search result to zero.

14. The method of claim 8, further comprising:

iterating the processing of the search results comprising:

generating an iterative score for each of the search results based on the one or more features of each of the search results and the relevance value weight of the one of more features of each of the search results;

based on generating of the iterative score for each of the search results, selecting a next iterative search result;

modifying the relevance value weight of each of the features comprised in the next iterative search result, the modifying of the relevance value weight reducing the relevance of each respective feature comprised in the next iterative search result;

repeating, a predefined number of iterations, the iterating the processing of the plurality of search results.

15. A non-transitory computer readable medium, comprising:

receiving content and a relevance model related to the content, the relevance model comprising:

a plurality of features; and a relevance value weight for each feature;

processing the content to generate a plurality of search results based on the plurality of features in the relevance model, each of the search results comprising one or more of the features in the relevance model;

generating an initial score for each of the search results using the relevance model, the initial score for each of the search results being calculated by:

determining a sum of the relevance value weights of the one or more features comprised in the search result;

multiplying the sum by a number of unique features within the search result, thereby generating a multiplied sum; and dividing the multiplied sum by a positional spread value, the positional spread value determined based on a distance between a first position of a first feature in the search result and a second position of a second feature in the search result, wherein the number of unique features comprise the first and second features;

based on the generation of the initial score for each search result, selecting an initial one of the search results;

modifying the relevance value weight of each feature comprised in the initial one of the search results, by reducing the relevance value weight of each feature comprised in the initial one of the search results;

generating a subsequent score for each search result other than the initial one of the search results, wherein the subsequent score for each search result of the remaining search results is generated using the relevance mode and is based on:

the one or more features comprised in each remaining search result;

the number of unique features within each remaining search result;

the positional spread of features within each remaining search result; and the relevance value weights of the one of more features comprised in each remaining search result, the relevance value weights being sourced from the relevance model, wherein the relevance model incorporates the relevance value weight of each feature that was comprised in the initial one of the search results; and based on the generation of the subsequent score for each remaining search result, selecting a subsequent search result from all of the remaining search results, the subsequent search result and the initial search result characterized by diverse and relevant ones of the features.

16. The non-transitory computer readable medium of claim 15, wherein the content comprises a text document, an image file, an audio file, or an audio-visual file, wherein:

when the content comprises a text document, the plurality of search results comprises passages of text and the features of the relevance model comprise text terms; and when the content comprises an image file, the plurality of search results comprises a grouping of pixels of the image file and the features of the relevance model comprise image samples;

when the content comprises an audio file, the plurality of search results comprises audio snippets and the features of the relevance model comprise audio samples; and when the content comprises an audio-visual file, the plurality of search results comprises audio-visual snippets and the features of the relevance model comprise audio-visual samples.

17. The non-transitory computer readable medium of claim 16, wherein when the content comprises a text document, the initial score for each of the search results is further based on the positional spread value of each passage of text computed based on the difference between a position of the last character in each passage relative to a reference text position in the text document and a position of the first character in each passage relative to the reference text in the text document.

18. The non-transitory computer readable medium of claim 15, wherein content comprises a text document and the plurality of search results comprises passages of text and the features of the relevance model comprise text terms, and the search results are computed based on parsing the text document to find a number of the text terms within the text document.

19. The non-transitory computer readable medium of claim 18, wherein the text terms in the initial search result and the text terms in the subsequent search result are different thereby producing diverse relevant text terms between the initial search result and subsequent search result.

20. The non-transitory computer readable medium of claim 15, wherein modifying the relevance value weight of each of the features comprised in the initial search result comprises setting the relevance value weight of each of the features comprised in the initial search result to zero.

21. The non-transitory computer readable medium of claim 15, further comprising:

iterating the processing of the search results comprising:

generating an iterative score for each of the search results based on the one or more features of each of the search results and the relevance value weight of the one of more features of each of the search results;

based on generating of the iterative score for each of the search results, selecting a next iterative search result;

modifying the relevance value weight of each of the features comprised in the next iterative search result, the modifying of the relevance value weight reducing the relevance of each respective feature comprised in the next iterative search result;

repeating, a predefined number of iterations, the iterating the processing of the plurality of search results.

\* \* \* \* \*